(12) United States Patent
Lee

(10) Patent No.: US 7,216,398 B2
(45) Date of Patent: May 15, 2007

(54) COMPUTER MOUSE WITH A CLEANING FUNCTION

(75) Inventor: Kuo-Vicent Lee, Taipei (TW)

(73) Assignee: Benext Inno-Product Development Ltd., Taipei (TW)

( * ) Notice: Subject to any disclaimer, the term of this patent is extended or adjusted under 35 U.S.C. 154(b) by 354 days.

(21) Appl. No.: 10/971,063

(22) Filed: Oct. 25, 2004

(65) Prior Publication Data

US 2006/0085944 A1 Apr. 27, 2006

(51) Int. Cl.
*A47L 7/00* (2006.01)

(52) U.S. Cl. .......................................... 15/339; 15/344

(58) Field of Classification Search ................... 15/339, 15/344

See application file for complete search history.

(56) References Cited

U.S. PATENT DOCUMENTS

| 4,656,687 A * | 4/1987 | Wei .............................. 15/339 |
| 6,459,955 B1 * | 10/2002 | Bartsch et al. .............. 700/245 |
| 2006/0272123 A1 * | 12/2006 | Di Nicolantonio et al. ... 15/339 |

* cited by examiner

*Primary Examiner*—Theresa T. Snider
(74) *Attorney, Agent, or Firm*—Bacon & Thomas, PLLC

(57) ABSTRACT

A computer mouse providing the functionality of a vacuum cleaner comprises a main mouse body and a vacuum device. The vacuum device is substantially mounted inside the main mouse body so that the shape of the computer mouse having the functionality of a vacuum cleaner is substantially that of the main mouse body. A user can use it as a mouse or as a vacuum cleaner to, for example, clean a computer keyboard.

9 Claims, 6 Drawing Sheets

COMPUTER MOUSE WITH A CLEANING FUNCTION

BACKGROUND OF THE INVENTION

1. Field of the Invention

The present invention relates to a computer mouse.

2. Description of the Related Art

Most inventions for the typical computer mouse deal with providing an input/output signal, such as a wireless mouse, an optical mouse, a roller mechanism in the mouse or page scrolling means.

However, no computer mouse provides a cleaning function, which may, for example, be used to clean a computer keyboard.

There are some vacuum cleaners that are designed for cleaning a computer keyboard, but since these are individual devices that have no physical connection to the computer host, users may sometimes have a hard time finding them.

Therefore, it is desirable to provide a computer mouse that provides the functionality of a vacuum cleaner to mitigate and/or obviate the aforementioned problems.

SUMMARY OF THE INVENTION

A main objective of the present invention is to provide a computer mouse with a vacuum cleaner functionality to clean, for example, a computer keyboard.

Another objective of the present invention is to use the partial space of a computer mouse as a containment space so that the shape of the present invention is substantially the same as or similar to that of a typical computer mouse.

In order to achieve the above mentioned objectives, a computer mouse with a vacuum cleaner functionality comprises a main mouse body and a vacuum device. The vacuum device is substantially mounted inside the main mouse body so that the shape of the computer mouse with a vacuum cleaner functionality is substantially that of the main mouse body. Furthermore, a circuit mechanism of the main mouse body provides the power for the vacuum device.

The vacuum cleaner comprises a motor and a fan, and the collected dust is stored in a containment space. The containment housing can be part of the main mouse body or a removable single housing.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
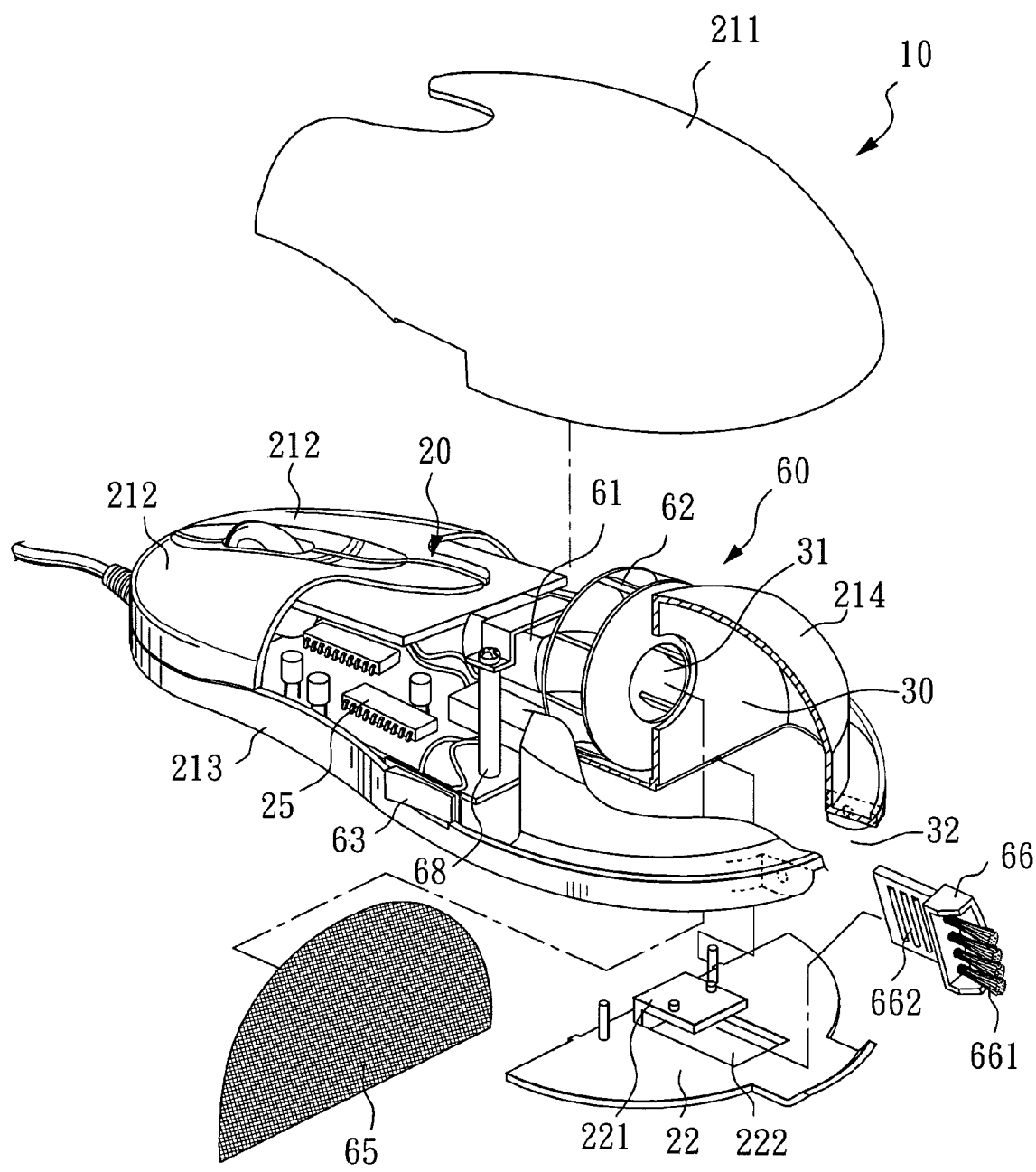
FIG. 1 is an exploded view of a first embodiment according to the present invention.
Figure 2:
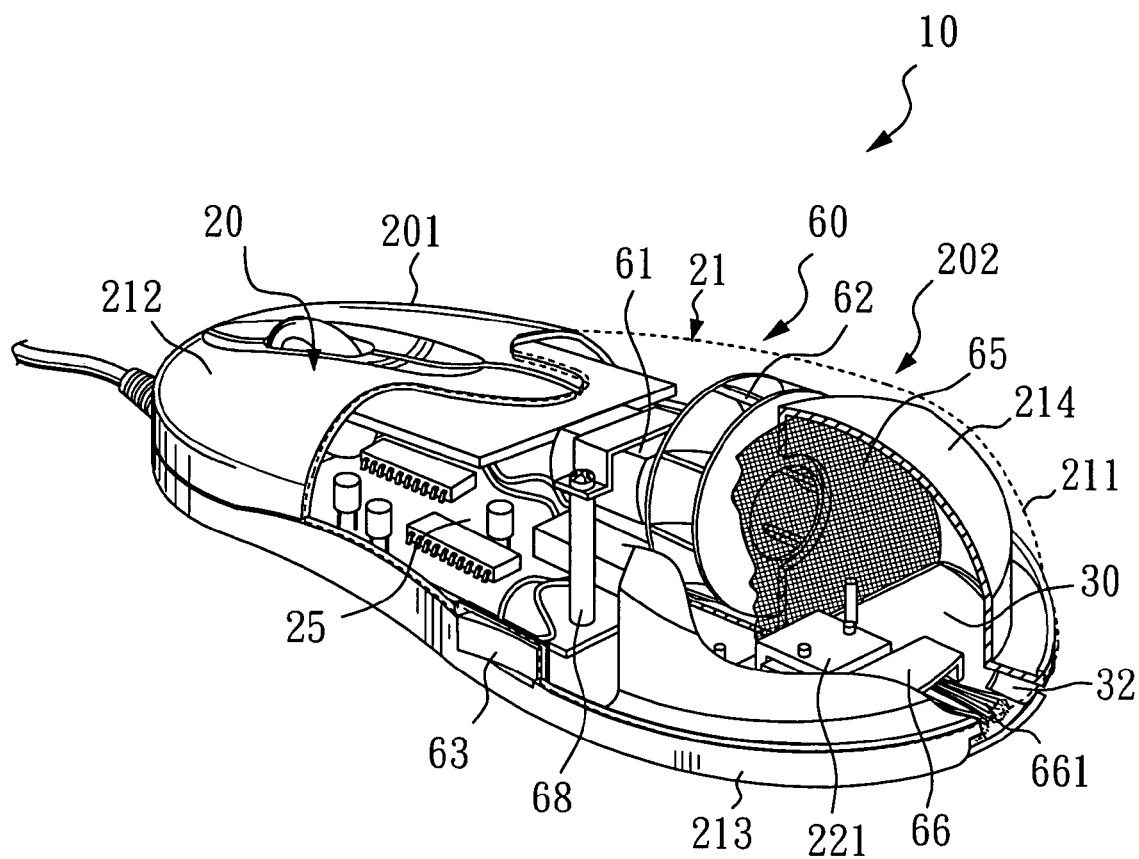
FIG. 2 is a cross-sectional view of the first embodiment according to the present invention.

Please refer to FIG. 1 to FIG. 5 for a first embodiment. A computer mouse with a vacuum cleaner functionality 10 is primarily composed of a main mouse body 20 and a vacuum device 60. The vacuum device 60 is substantially mounted inside of the main mouse body so that the shape of the computer mouse 10 is substantially that of the main mouse body.

The function of the main mouse body 20 is like that of a typical computer mouse, which also has a key portion 201 (usually placed at the front portion of the mouse) and a gripping portion 202 (usually placed at the rear portion of the mouse). The main mouse body 20 comprises a housing 21 and a mouse circuit mechanism 25 in the housing 21.

In this embodiment, the housing 21 comprises a holding housing 211, at least one key 212, a bottom housing 213, and a cover 22. The main mouse body 20 can be a mouse with a roller ball, an optical mouse, or a wireless mouse. Since the computer mouse is well known technology, no further detailed description is provided about the housing 21 and the mouse circuit mechanism 25.

The vacuum device 60 is mounted in the housing 21 and comprises a motor 61 and a fan 62. The motor 61 is fixed to a shaft 68 and connected to the mouse circuit mechanism 25 via a cable 69 to obtain power from the mouse circuit mechanism 25. The mouse circuit mechanism 25 is supplied power by a computer (particularly for a wired mouse, though not shown) or a battery in the mouse (particularly for a wireless mouse, though not shown). A switch 63 is placed appropriately on the housing 21 for controlling the power for the motor 61.

The bottom housing 213 is arched at the gripping portion 202 to form a containment housing 214, and a containment space 30 for storing dust collected by the vacuum device 60 is therefore provided by the containment housing 214. The containment housing 214 comprises an opening 31 and an inlet 32, and a filter 65 which is placed over the opening 31.

The cover 22 is mounted below the containment housing 214 and comprises a guide plate 221 and a guide slot 222. When a user wants to clean the containment space 30, he or she can open the cover 22. The suction nozzle 66 is placed between the guide plate 221 and the guide slot 222, and the suction nozzle 66 comprises a brush 661 and a non-slip portion 662. To be noted is that the suction nozzle 66 can be designed as a slim pipe without brush 661 so that it is easier to collect particles (not shown) in a slit.

Figure 3:
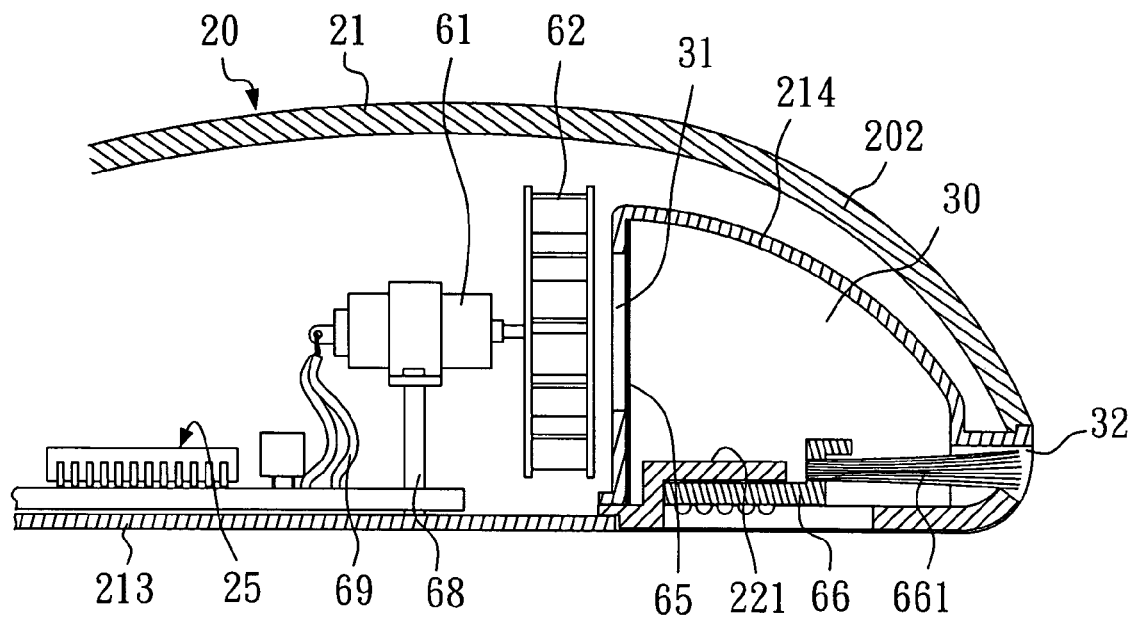
FIG. 3 is a schematic drawing of the first embodiment showing a suction nozzle under a non-push-out status according to the present invention.
Figure 4:
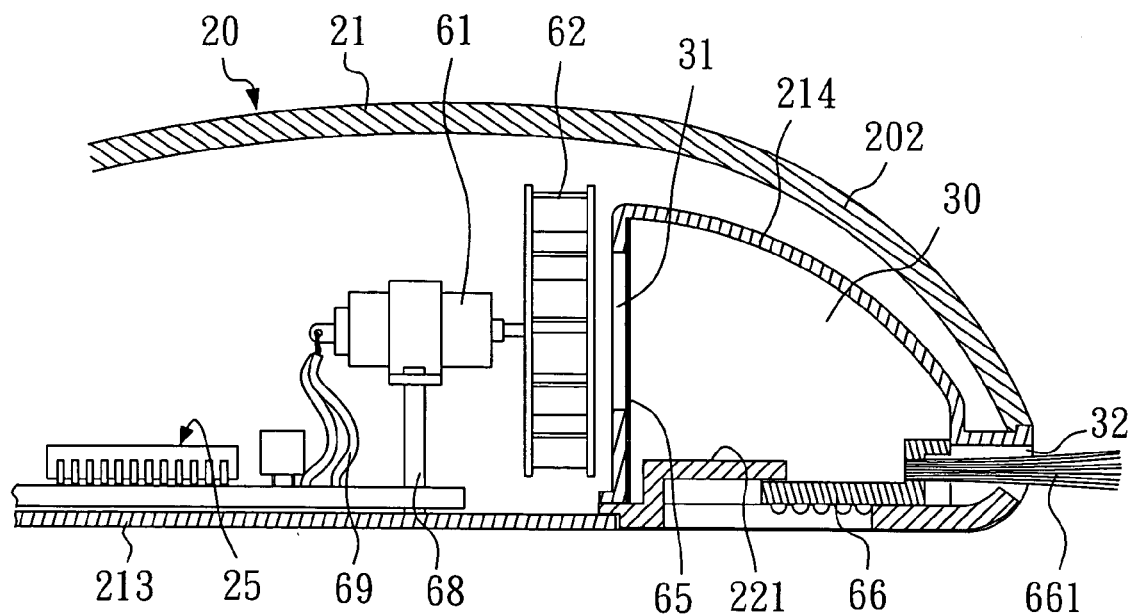
FIG. 4 is a schematic drawing of the first embodiment showing the suction nozzle under a push-out status according to the present invention.
Figure 5:
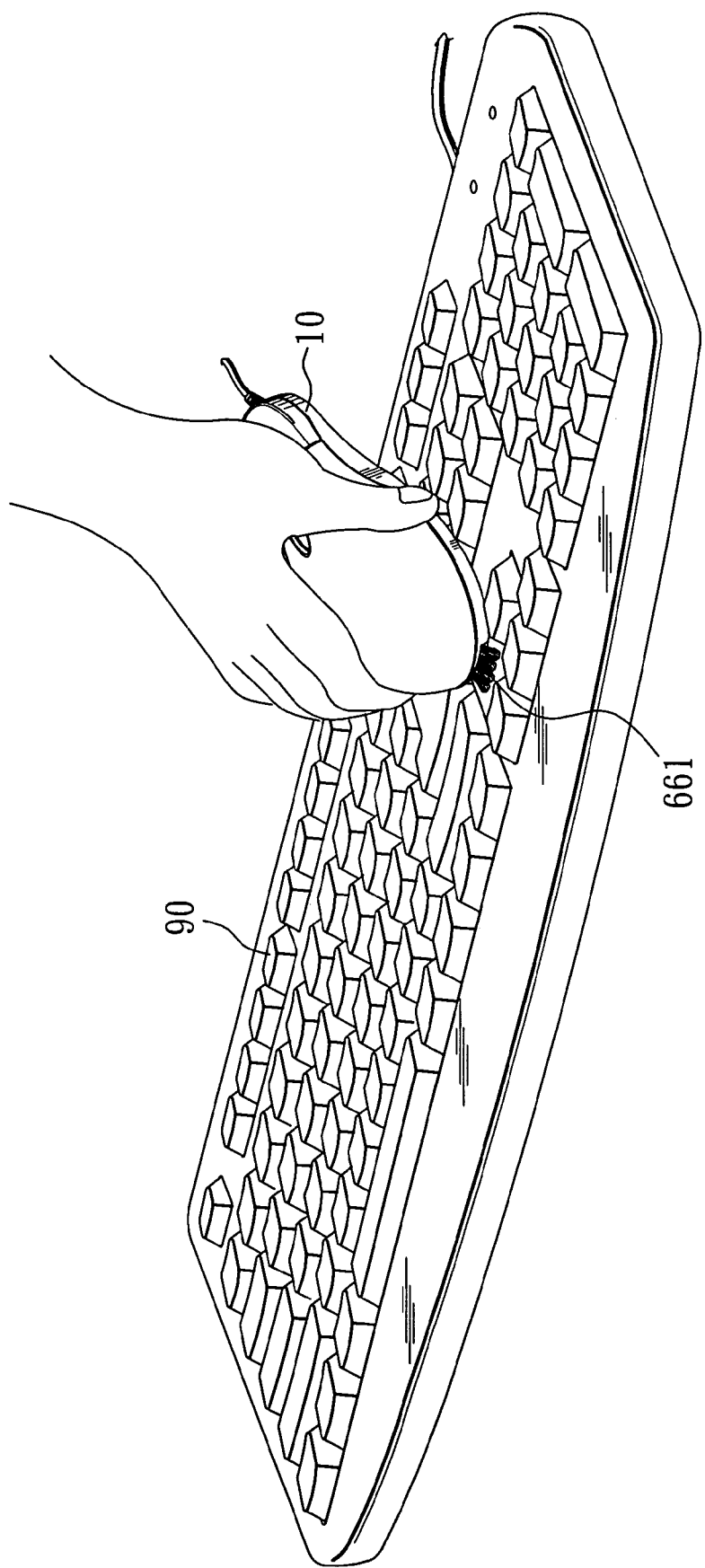
FIG. 5 is a status schematic drawing of using the present invention.

Please refer to FIG. 3 and FIG. 4. FIG. 3 is a schematic drawing of the first embodiment that does not show the suction nozzle according to the present invention. When the user wants to use the vacuum device 60, he or she can use a finger to push out the suction nozzle 66 (as shown in FIG. 4) and turn on the switch 63. Then, the motor 61 drives the fan 62 to generate suction. Taking the cleaning of a keyboard 90 (as shown in FIG. 5) as an example, any dust or particles (not shown) in the keyboard 90 are collected into the containment space 30 via the inlet hole 32 and stay in the containment space 30 due to the filter 65.

Figure 6:
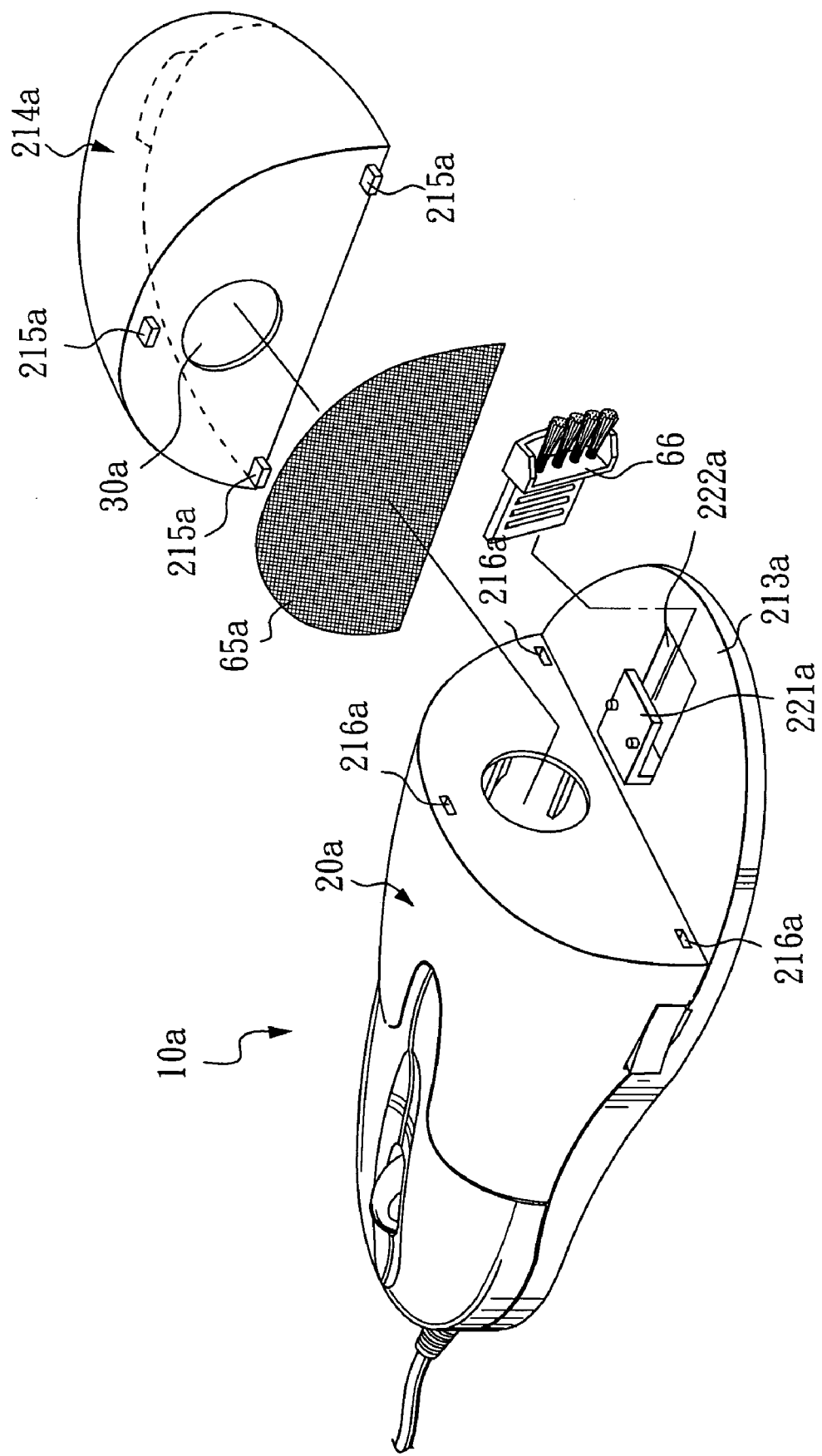
FIG. 6 is an exploded view of a second embodiment according to the present invention.
Figure 7:
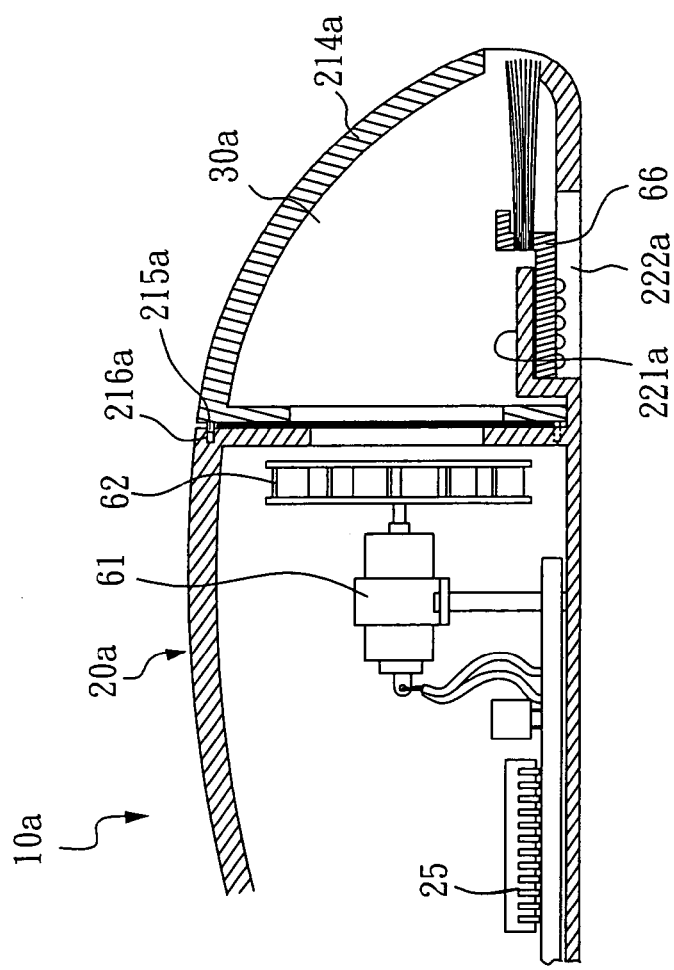
FIG. 7 is a cross-sectional view of the second embodiment according to the present invention.

Please refer to FIG. 6 and FIG. 7 for a second embodiment according to the present invention. A primary difference between the first embodiment and the second embodiment is that the containment housing 214 in the first embodiment is not removable from the main mouse body 20, whereas a containment housing 214a in the second embodiment is removable from the main mouse body 20a. The main mouse body 20a has a plurality of fastening slots 216a, and the containment housing 214a has corresponding tenons 215a so that the containment housing 214a can be removable from the mouse main body 20. In the second embodiment, there is no cover, and the guide plate 221a and the guide slot 222a are directly mounted on the bottom housing 213a. When the user wants to clean the containment space 30a, he or she can directly open the containment housing 214a.

Although the present invention has been explained in relation to its preferred embodiment, it is to be understood that many other possible modifications and variations can be made without departing from the spirit and scope of the invention as hereinafter claimed. For example, the vacuum cleaner can be designed as an independent component with a rechargeable battery. When the vacuum cleaner combines with the main mouse body, the rechargeable battery can be charged. Therefore, a user can separate the vacuum cleaner from the main mouse body and hold the vacuum cleaner only to clean, for example, a keyboard.

What is claimed is:

1. A computer mouse with a vacuum cleaner functionality comprising:
   a main mouse body comprising:
      a housing;
      a mouse circuit mechanism mounted in the housing; and
   a vacuum cleaner combined with the main mouse body and providing a suction force, wherein the vacuum cleaner comprises a containment space.

2. The computer mouse as claimed in claim 1, wherein the vacuum cleaner in placed is the housing.

3. The computer mouse as claimed in claim 1, wherein the vacuum cleaner is connected to the mouse circuit mechanism so that the mouse circuit mechanism supplies power to the vacuum cleaner.

4. The computer mouse as claimed in claim 2, wherein the vacuum cleaner is connected to the mouse circuit mechanism so that the mouse circuit mechanism supplies power to the vacuum cleaner.

5. The computer mouse as claimed in claim 1, wherein the vacuum cleaner comprises a motor and a fan.

6. The computer mouse as claimed in claim 4, wherein the vacuum cleaner comprises a motor and a fan.

7. The computer mouse as claimed in claim 1 further comprising a containment housing to form the containment space.

8. The computer mouse as claimed in claim 7, wherein the containment housing is not removable from the main mouse body.

9. The computer mouse as claimed in claim 7, wherein the containment housing is removable from the main mouse body.

* * * * *